United States Patent [19]

Heckman

[11] Patent Number: 4,708,066
[45] Date of Patent: Nov. 24, 1987

[54] COMBINATION RAIL AND HIGHWAY VEHICLE

[75] Inventor: Glenard W. Heckman, Des Moines, Iowa

[73] Assignee: Little Giant Crane and Shovel, Inc., Des Moines, Iowa

[21] Appl. No.: 813,699

[22] Filed: Dec. 27, 1985

[51] Int. Cl.[4] ............................................. B60F 1/00
[52] U.S. Cl. ................................................ 105/215.2
[58] Field of Search ............ 105/215 C, 215 R, 215.1, 105/215.2, 72.2

[56] References Cited

U.S. PATENT DOCUMENTS

| | | | |
|---|---|---|---|
| 2,018,972 | 10/1935 | Pollock et al. | 105/215 C |
| 2,116,525 | 5/1938 | Luce | 105/215 C |
| 2,879,719 | 3/1959 | Gaebler | 105/215.2 |
| 3,244,118 | 5/1966 | Lich | 105/215.2 |
| 3,434,432 | 3/1969 | Seifert | 105/215 C |
| 3,945,326 | 3/1976 | Seifert | 105/215 C |
| 4,316,418 | 2/1982 | Hindin et al. | 105/215.2 |
| 4,355,584 | 10/1982 | White, Jr. | 105/215 C |
| 4,364,315 | 12/1982 | Beatty | 105/215.2 |
| 4,448,132 | 5/1984 | Beatty | 105/215.2 |
| 4,468,966 | 9/1984 | Bradshaw | 105/215 C X |

FOREIGN PATENT DOCUMENTS 344048   3/1931   United Kingdom .............. 105/215

Primary Examiner—David A. Scherbel
Attorney, Agent, or Firm—Rudolph L Lowell

[57] ABSTRACT

The combination highway and rail vehicle has front and rear sets of road wheels and front and rear sets of rail guide wheels. The rear set of rail wheels is pivotally supported on the main frame for up and down adjustable pivotal movement to predetermined positions, and for road travel is equipped with a pair of spare road wheels that are secured to the rail wheels for rotation therewith about a common axis. With the spare road wheels in ground engagement, the rear set of rail wheels or tag assembly is pivotally adjusted to urge the spare road wheels downwardly against the road surface to carry a portion of the rear axle vehicle load concurrently with transferring a further portion of the vehicle load to the front vehicle axle to distribute the gross vehicle load over the load carrying axles within legal and permissible load limits for road travel.

6 Claims, 9 Drawing Figures

COMBINATION RAIL AND HIGHWAY VEHICLE

BACKGROUND OF THE INVENTION

Combination highway and rail vehicles are in general use and usually include a main frame having front steerable wheels and rear traction wheels for highway travel and, additionally, forwardly and rearwardly carried rail wheels for rail travel. In highway travel, the rail wheels are supported in a ground clearance relation, and in rail travel the rail wheels guide the travel of the vehicle on the rails with the vehicle road wheels ridable on the rails. During rail travel, the rail wheels support a part of the vehicle weight. However, in road travel the full weight of the vehicle is carried on the front and rear vehicle axles.

The equipment provided on these combination highway and rail vehicles varies according to the specifications for the different rail jobs to be performed. Weight or load limits on the vehicle axles for rail travel are not critical. However, in converting the vehicle from rail to highway travel, the load from the rail wheel axles transferred to the vehicle highway axles often exceeds the safe legal load limits for the vehicle axles. Unless special permits for such axle overloading for road travel are obtained, fines and other penalties may be incurred by the vehicle owner.

This objection is overcome by the present invention by mounting spare road wheels on the tag or rear rail wheel assembly and then utilizing the tag assembly to support a portion of the vehicle weight so that the gross vehicle load is distributed on the vehicle axles within legal load limits for highway travel.

SUMMARY OF THE INVENTION

The invention relates to a combination highway and rail heavy duty vehicle which can operate both on the highway, using rubber tired wheels, and on rails using front and rear rail wheels to guide the vehicle on the rails, with the highway wheels riding the rails. In rail travel, the vehicle weight is distributed over all of the wheel axles, but since axle weights for rail travel are not legally controlled, such weight distribution is not critical. To adjust axle load weight for road travel in accordance with legal requirements, the invention provides for mounting spare road wheels on the rear rail wheels in a dual coaxial relation. The axle for each rear rail wheel is equipped with a fixed outwardly projected hub member formed with an inner external spline section and an outer threaded section. A spare road wheel has a mating internal spline section for nesting engagement within the hub spline member, with coacting means on the road wheel and rail wheel guiding the two wheels into coaxial alignment. A retaining nut threadable on the threaded section of the rail wheel hub positively locks the road wheel on the rail wheel in a dual wheel relation. With the road wheels in ground engagement, the rear rail wheel or tag assembly is pivotally urged downwardly to effect a lifting force at the rear end of the vehicle frame to transfer some of the vehicle weight to the spare road wheels, by tending to tilt the main vehicle frame upwardly and forwardly. This tilting action concurrently removes some of the load from the vehicle rear axle for transfer to the front vehicle axle. As a result, the vehicle gross weight can be distributed over three axles, namely, the normal front and rear road wheel axles and the rear track wheel assembly, in amounts dependent upon the downward force or pressure applied on the spare road wheels. Additional equipment, as required on the vehicle to perform specified jobs for rail use, can thus be safely carried by the vehicle within legal load limits for road travel.

BRIEF DESCRIPTION OF THE PREFERRED EMBODIMENT

Figure 1:
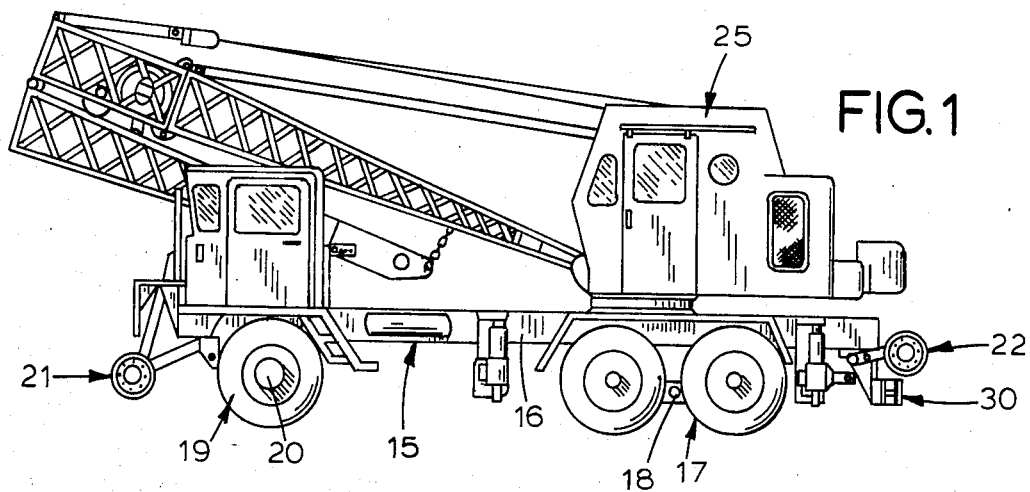
FIG. 1 is a side elevational view of a combination rail and highway vehicle showing the rail guide wheel assemblies in elevated transport positions for vehicle highway travel.

Referring to the drawings, there is shown in FIG. 1 a combination highway and rail vehicle 15 including a frame 16, a bogie rear wheel and axle assembly 17 having a bogie axle 18, a vehicle front steering wheel assembly 19 having an axle 20, a front rail guide wheel assembly 21 and a rear rail guide wheel or tag assembly 22. As illustrated, the rail guide wheel assemblies 21 and 22 are in their elevated or transport positions providing for a highway travel of the vehicle 15. In a rail travel of the vehicle, the assemblies 21 and 22 are moved into lowered positions illustrated only for the tag assembly 22 in FIG. 2. It is seen, therefore, that when the vehicle 15 is adapted for rail travel, the vehicle load is distributed over the vehicle wheel and axle assemblies 17 and 19 and, additionally, over the rail guide wheel and axle assemblies 21 and 22.

The gross load carried by the vehicle 15 will vary according to the equipment specified for its rail use operations, such as, for example, the requirement for a heavy duty crane 25 and of a car coupler unit 30 (FIG. 1) providing for the vehicle 15 functioning as a locomotive for moving box cars and the like. The additional load imposed on the vehicle 15 by this equipment is not controlled by any legal load limitations on the various axle assemblies so long as the vehicle is in rail use. However, when the vehicle is conditioned for highway travel, the load previously carried by the rail wheel assemblies 21 and 22 is transferred to the vehicle road wheel assemblies 17 and 19. Since the vehicle 15 is subject to legal load axle limits for highway travel this transfer of weight often times results in the rear vehicle wheel assembly 17 being loaded beyond specified legal load limits.

Figure 3:
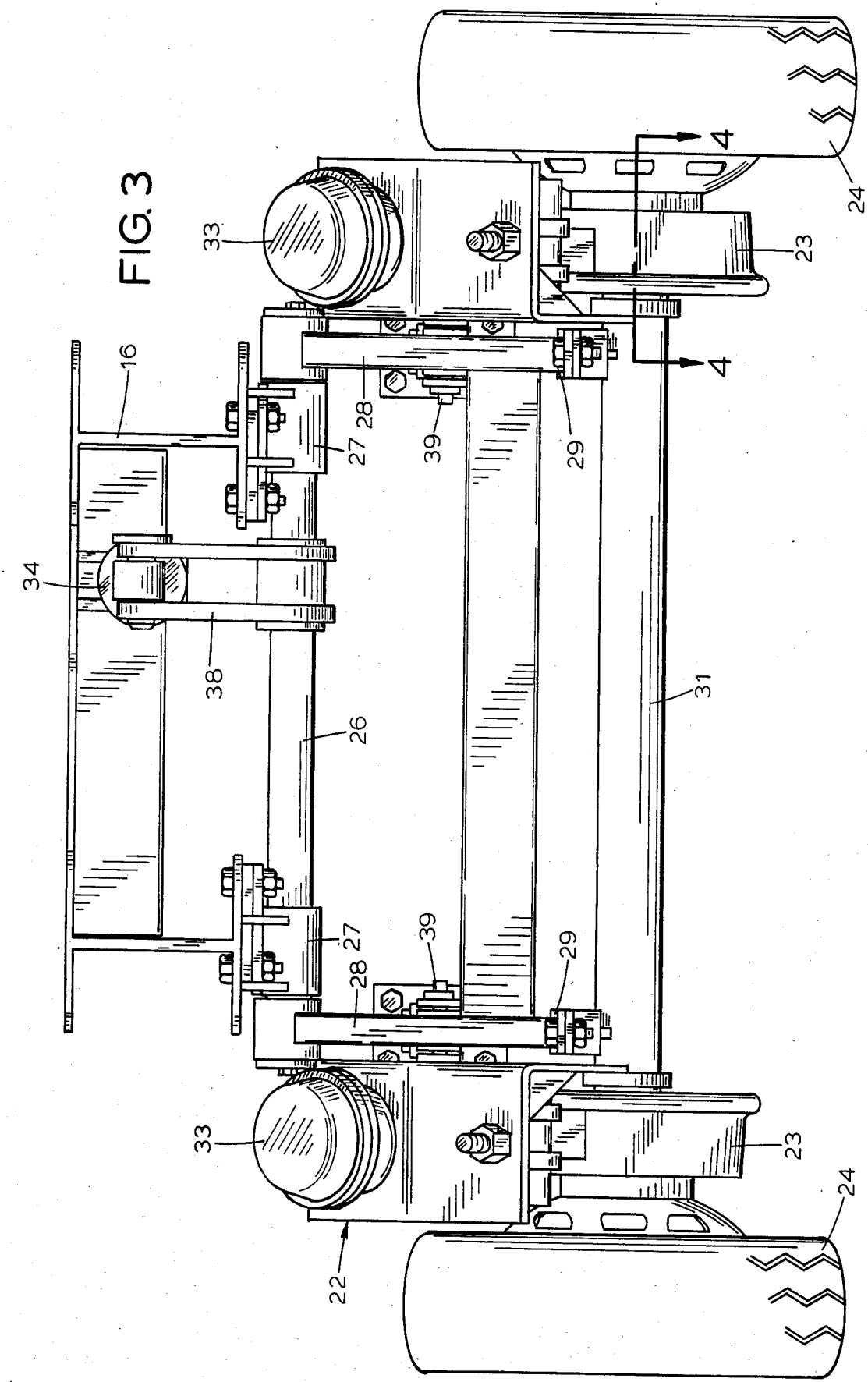
FIG. 3 is an enlarged rear view of the tag assembly with the spare road wheels mounted thereon and positioned for highway travel.
Figure 4:
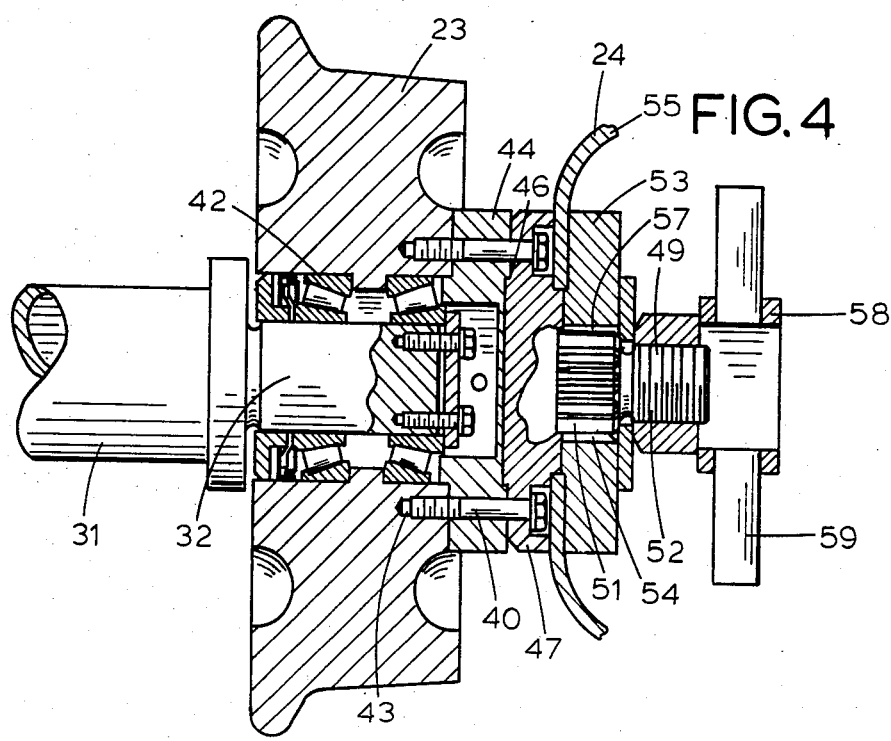
FIG. 4 is an enlarged sectional view taken along line 4—4 in FIG. 3.

In the present invention, each rail wheel 23 (FIG. 3) of the tag assembly 22 is adapted for assembly with an associated spare road wheel 24 mounted in coaxial alignment with a rail wheel 23 and movable in response to up and down movement of the tag assembly 22 into and out of engagement with the road surface. The tag assembly 22 is of a usual type (FIG. 3) and includes a rock shaft 26 mounted in journals or bearing units 27 suitably carried adjacent the rear end of the vehicle frame 16. The rock shaft 26 carries a pair of axially spaced rock arms 28 the free ends 29 of which support a wheel axle 31. A rail wheel 23 is rotatably mounted on a stub shaft 32 projected outwardly from each end of the axle member 31 (FIG. 4). An air brake 33 (FIGS. 2 and 3) is operatively associated with the peripheral surface of each rail wheel 23 for braking action concurrently with the actuation of the vehicle road wheel brakes (not shown).

A pivotal up and down movement of the rail wheels 23 takes place in response to an oscillation of the rock shaft 26 by a hydraulic cylinder assembly 34 mounted on and extended longitudinally of the vehicle frame 16 with its piston rod 36 connected at 37 to the free ends of rock arms 38 on the rock shaft 26. For rail operation the tag assembly 22 is retained in a fixed position by a locking unit 39 releasably connectible with the rock arms 28 by a locking pin 41.

Since each rear wheel 23 and spare road wheel 24 are similar in construction and in their assembly for road travel only one of such assemblies will be described in detail with like numbers referring to like parts. As shown in FIG. 4, a rail wheel 23 is rotatably mounted on a stub shaft 32 by a bearing unit 42 that is generally protected by a coverplate (not shown) secured to the wheel 23 by means of bolts 40 engageable in threaded holes 43 circumferentially arranged relative to the axis of the wheel 23.

In the mounting of the spare road wheel 24 in axial alignment with the rail wheel 23, the standard cover plate for the bearing 32 is replaced by a cover plate 44 (FIG. 4) that is in concentric mating engagement at 46 with a road wheel mounting plate 47. The cover plate 44 and mounting plate 47 have holes therein arranged for axial alignment with the threaded holes 43 in the rail wheel 23 for receiving the bolts 40 to secure the cover plate 44 and mounting plate 47 in a rigid unitary assembly with rail wheel 23.

The mounting plate 47 may be integrally formed with an outwardly projected shaft or hub 49 that has an external splined inner section 51 and a threaded outer section 52. The spare road wheel 24 has its flange or web section 55 provided at its inner end with an integrally secured hub plate 53 having the peripheral surface of a center bore 54 formed with an internal spline 57 to receive in meshed engagement the external splined section 51 of the hub 49. With the spare road wheel 24 thus mounted on the hub 49, the outer threaded section 52 of the hub projects outwardly from the hub plate 53 for threaded engagement with a lock nut 58 equipped with a manual turning handle 59.

Figure 2:
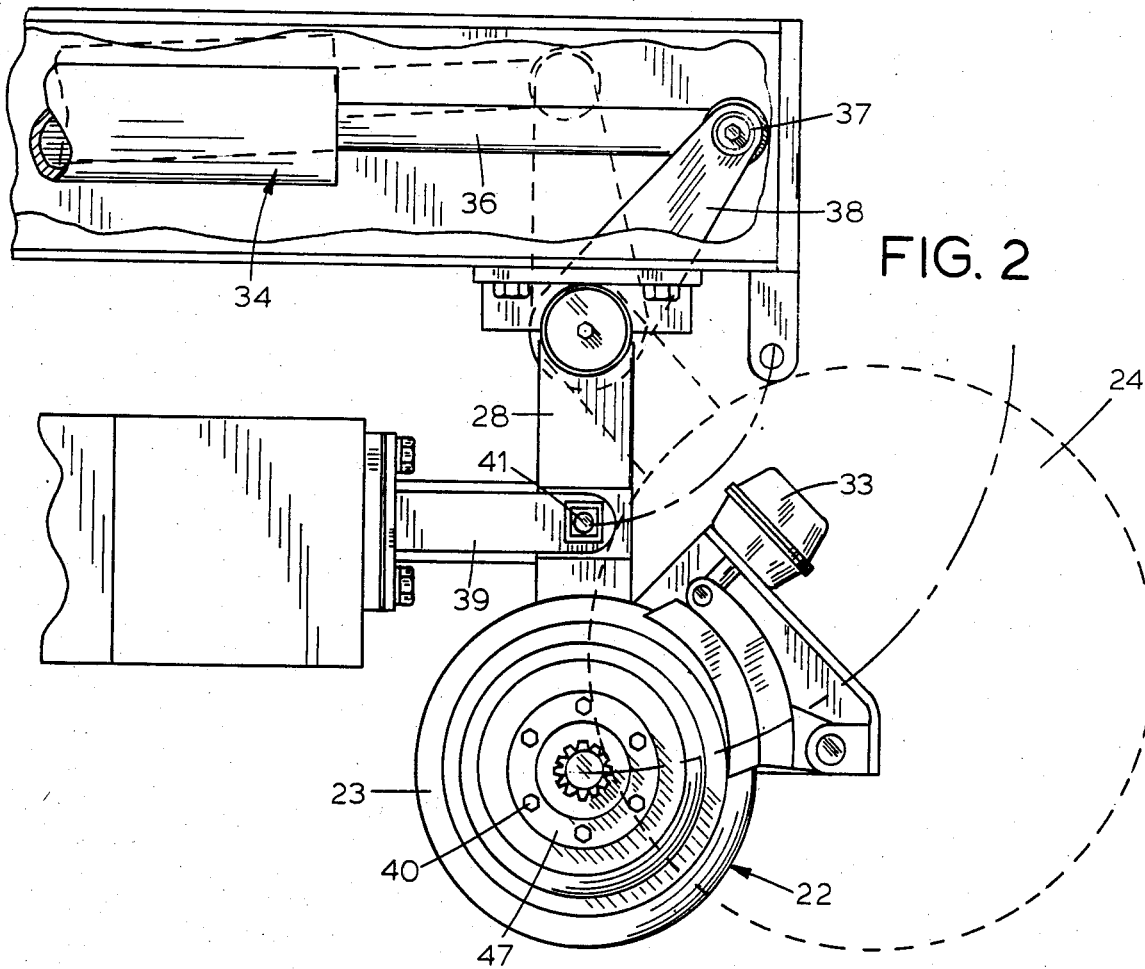
FIG. 2 is an enlarged side elevational detail view of the tag or rear rail wheel assembly shown in a lowered position for rail travel with a rail wheel of the assembly illustrated with a hub member thereon for supporting a spare road wheel for highway travel of the vehicle.
Figure 5:
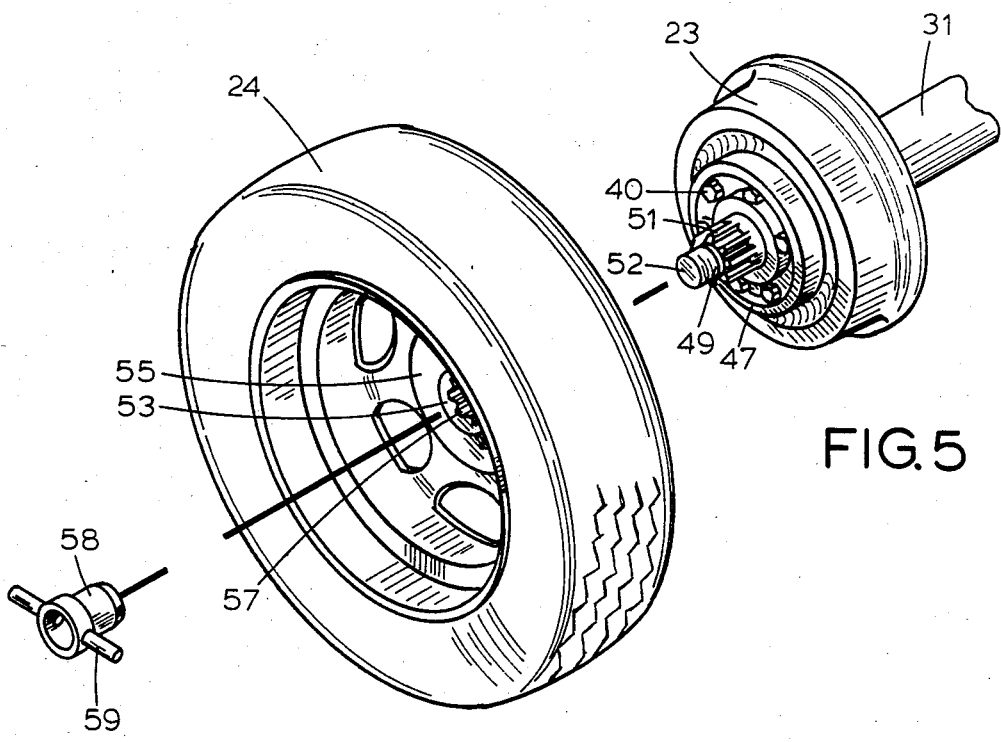
FIG. 5 is an exploded perspective view of the spare road wheel and rail wheel assembly.

As shown in FIGS. 2 and 5, the mounting plate 47 may remain attached to the rail wheel 23 to facilitate the quick assembly of the spare road wheel therewith in the changeover of the vehicle from rail travel to highway travel and vise versa. In this changeover, the tag assembly 23 is in its elevated or transport position, indicated by dotted lines in FIG. 2, to permit a free movement of the road wheel 24 axially of the rail wheel 23 whether or not the vehicle is in the rail or road travel mode.

Let it be assumed that the spare road wheels 24 have been mounted on their associated rail wheels 23 for road travel of the vehicle 15 and that the tag assembly 22 is in the elevated position therefor. The hydraulic cylinder 34 is then operated to move the tag assembly to a lowered position for road engagement of the wheels 24. To permit such operation of the tag assembly 22, and as illustrated in FIG. 7, the spare road wheels 24 are of an appreciably reduced diameter relative to the vehicle wheels 19. With the wheels 24 in road engagement, let it be further assumed that the bogie axle 18 of the assembly 17 is subjected to a load exceeding legal load limits as shown by the vehicle frame 16 being inclined downwardly and rearwardly. To correct this overload condition on the bogie axle 18, the hydraulic cylinder 34 (FIG. 6) is actuated to apply a downward pressure on the tag assembly 22 and move the spare road wheels 24 forwardly so that a lifting pressure applied at the rear end of the vehicle frame 16 acts to transfer load from the bogie axle 18 on to the front wheel axle 20 and tag assembly axle 31.

Figure 6:
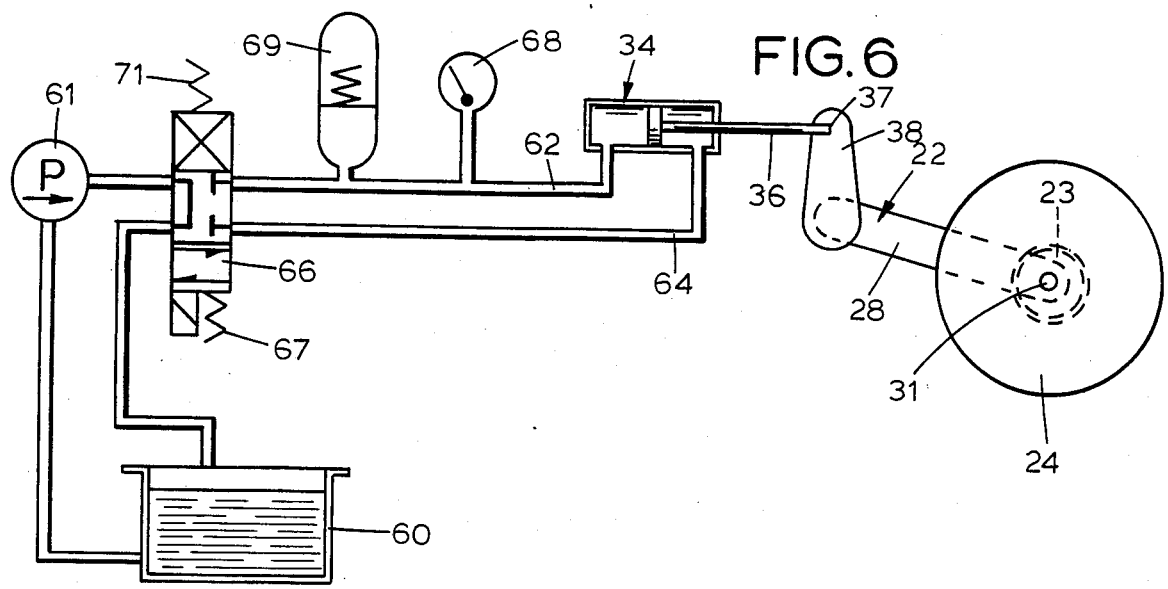
FIG. 6 is a diagrammatic illustration of a hydraulic control circuit for operating the tag assembly between rail and transport positions therefor.
Figure 7:
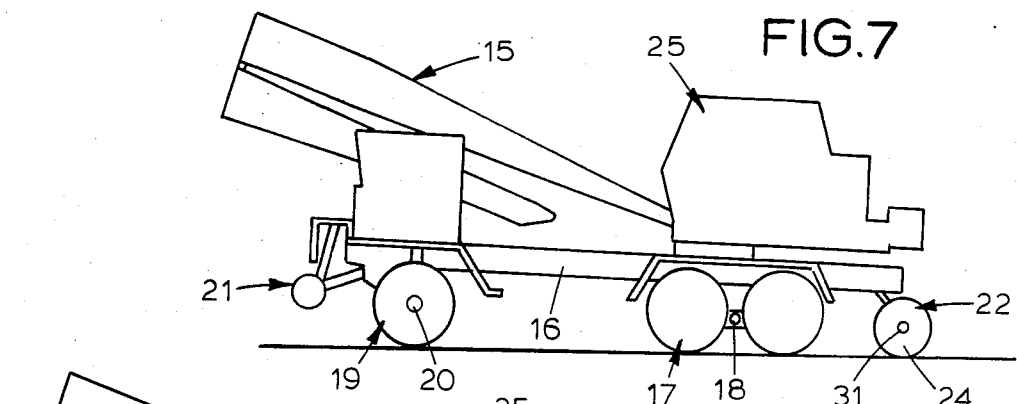
FIG. 7 is a diagrammatic illustration of a vehicle adapted for highway travel and showing the vehicle rear axle subject to an overload condition.

Referring to FIG. 6, the hydraulic control system for the cylinder assembly 34 includes a pump 61 and oil reservoir 60 suitably carried on the vehicle 15 with the pump in operative association with the vehicle engine (not shown). The cylinder assembly 34 is of double acting type having a first line 60 and a second line 64 connectible to the pump and reservoir 62 through solenoid control valve 66 having an intermediate neutral position wherein fluid from the pump 61 is bypassed through the valve 66 for direct return to the reservoir 60.

Figure 8:
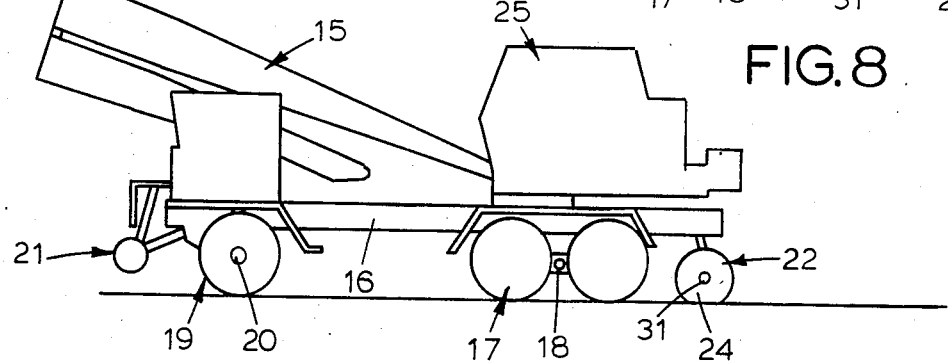
FIG. 8 is illustrated similarly to FIG. 7 and shows the transfer of load from the vehicle rear axle to the tag assembly and front vehicle axle.

On actuation of the solenoid 67 of the control valve 66, pressure is applied by the cylinder assembly 34 to urge the spare road wheels 24 into road engagement with the applied pressure being indicated by a suitable gauge 68 connected in the first line 62. This pressure is maintained on the road wheels 24 during road travel of the vehicle with a limited floating movement of the wheels 24 being permitted by an accumulator 69 also connected in the first line 62. Removal of pressure from the road wheels 24 and movement of the tag assembly 22 to its elevated position takes place on actuation of the solenoid 71 of the control valve 66 providing for the flow of oil under pressure to the second line 64 and the exhaust of fluid through the first line 62 to the reservoir 60. It is seen, therefore, that for road travel the gross weight on the vehicle 15 can be distributed over the axles 18, 20 and 31 by varying the application of downward pressure on the tag assembly 22 by the cylinder assembly 34. FIG. 8 illustrates the tag assembly 22 in moved position relative to its showing in FIG. 7, providing for the lifting of the rear end of the vehicle frame 16 into a substantial horizontal position relative to its inclined position shown in FIG. 7.

Figure 9:
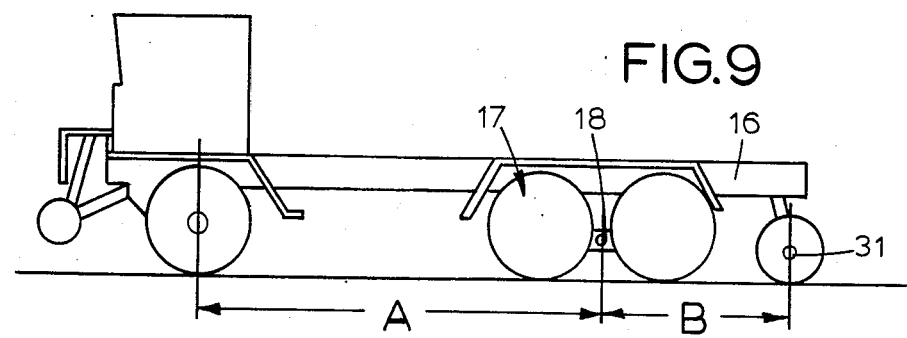
FIG. 9 is a diagrammatic illustration of a vehicle showing the vehicle wheel base dimension and the spacing of the tag assembly axle from the vehicle rear axle.

In one embodiment of the invention and as shown in FIG. 9, the vehicle 15 has a wheel base A of about 170 inches and a distance of 95 inches between the bogie axle 18 and tag assembly axle 31. In this embodiment, assume the legal load limit on the bogie axle 18 to be 34,000 pounds; on the front wheel axle 20, a load of 13,000 pounds; and on the tag assembly 31, a load of 4,000 pounds. With the spare road wheels 24 out of road engagement, the axle front load by test was found to be 11,800 pounds and the bogie axle load 37,200 pounds for a gross load of 49,020 pounds. With the bogie axle 18 carrying an overload in excess of 3,000 pounds, the tag assembly 22 was actuated to apply a pressure on the road wheels 24 of 550 pounds per square inch, as indicated on the gauge 68. This pressure provided for a distribution of the 49,020 pound gross load to 13,460 pounds on the front wheel axle 20; a load of 32,520 pounds on the bogie axle 18, and a load of 3,020 pounds on the tag assembly axle 31, all within required legal load limits for a gross weight of about 49,000 pounds. To indicate the extent of the load that could be distributed over the wheel axles when the pressure applied on the hydraulic cylinder assembly 34 was increased to 700 pounds per square inch, this pressure increased the load on the front axle 20 to 15,820 pounds, and on the trailing axle 31, to 7,200 pounds, with a corresponding decrease of the load on the bogie axle 18 to 26,280 pounds. The spare road wheels 24 being of a reduced size relative to the standard vehicle wheels provides for their being carried in storage positions at conveniently accessible locations to facilitate their use for highway travel of the vehicle.

Although the invention has been described with respect to a preferred embodiment thereof, it is to be understood that it is not to be so limited since changes and modifications can be made therein which are within the full intended scope of this invention as defined by the appended claims.

I claim:

1. For use in a combination self-propelled highway and rail vehicle having a main frame, front and rear road wheel axle assemblies secured to the frame and wherein the rear road wheels are used for road and rail travel of the vehicle, and front and rear rail wheel axle assemblies pivotally supported on the frame for movement to upper and lower positions therefor:
   (a) a pair of spare road wheels mountable on said rear rail wheel axle assembly in axial alignment with the rail wheels thereof for road travel of the vehicle,
   (b) power means on said frame for pivotally moving the rear rail wheel axle assembly to said lower position wherein the spare road wheels are in road engagement, and
   (c) means for applying a predetermined pressure on the road engaged spare road wheels by said power means to vary the axle loads on said front and rear road wheel axle assemblies.

2. The invention according to claim 1, including:
   (a) means for adjustably controlling the pressure applied on the spare road wheels to vary the axle loads on said front and rear road wheel assemblies and said rear rail wheel axle assembly within given safe road travel load limits therefor.

3. The invention according to claim 1, wherein:
   (a) said power means includes a hydraulic cylinder assembly connected to said main frame and rear rail wheel axle assembly and a pump means on said main frame for supplying oil under pressure to said hydraulic cylinder assembly, and
   (b) valve means for controlling the supply of oil to said hydraulic cylinder assembly.

4. The invention according to claim 3, including:
   (a) a pressure gauge intermediate said valve means and hydraulic cylinder assembly for indicating the pressure of the oil applied to said hydraulic cylinder assembly when said spare road wheels are in road engagement.

5. In a combination self-propelled highway and rail vehicle having a main frame, front and rear road wheel axle assemblies secured to the frame and wherein the rear road wheels are used for road and rail travel of the vehicle, and front and rear rail wheel axle assemblies pivotally supported on the frame for movement to upper and lower positions therefor:
   (a) means for relatively controlling the vehicle load carried on said front and rear road wheel axle assemblies for vehicle road travel including a pair of spare road wheels,
   (b) means for mounting each spare road wheel in an axially aligned dual relation with a rear rail wheel,
   (c) power means for pivotally moving the rear rail wheel axle assembly to said upper and lower positions therefor,
   (d) said spare road wheels, when mounted on the rear rail wheels for highway travel, being movable into road engagement on movement of the rear rail wheel assembly by said power means to the lower position therefor, and
   (e) means for adjustably controlling the power applied by said power means on the rear rail wheel axle assembly, when the spare road wheels are in road engagement, to relatively distribute the vehicle load carried on said front and rear road wheel axle assemblies and rear rail wheel axle assembly within given axle load limits for road travel of the vehicle.

6. The invention according to claim 5, wherein:
   (a) said mounting means includes coacting means on each spare road wheel and associated rear rail wheel for coaxially aligning said wheels, and
   (b) means for locking said wheels in coaxial alignment for unit rotation.

* * * * *